US008719027B2

(12) United States Patent
Chen et al.

(10) Patent No.: US 8,719,027 B2
(45) Date of Patent: May 6, 2014

(54) NAME SYNTHESIS

(75) Inventors: Yining Chen, Beijing (CN); Yusheng Li, Beijing (CN); Min Chu, Beijing (CN); Frank Kao-Ping Soong, Beijing (CN)

(73) Assignee: Microsoft Corporation, Redmond, WA (US)

(*) Notice: Subject to any disclaimer, the term of this patent is extended or adjusted under 35 U.S.C. 154(b) by 1534 days.

(21) Appl. No.: 11/712,298

(22) Filed: Feb. 28, 2007

(65) Prior Publication Data

US 2008/0208574 A1 Aug. 28, 2008

(51) Int. Cl.
*G10L 13/00* (2006.01)
*G10L 15/00* (2013.01)

(52) U.S. Cl.
USPC ............................ 704/260; 704/257; 704/258

(58) Field of Classification Search
USPC ................................................ 704/260, 270
See application file for complete search history.

(56) References Cited

U.S. PATENT DOCUMENTS

| | | | | |
|---|---|---|---|---|
| 5,040,218 A * | 8/1991 | Vitale et al. | 704/260 |
| 5,212,730 A | 5/1993 | Wheatley et al. | 381/43 |
| 5,752,230 A | 5/1998 | Alonso-Cedo | 704/270 |
| 5,787,231 A * | 7/1998 | Johnson et al. | 704/260 |
| 5,890,117 A * | 3/1999 | Silverman | 704/260 |
| 6,012,028 A * | 1/2000 | Kubota et al. | 704/260 |
| 6,078,885 A | 6/2000 | Beutnagel | 704/258 |
| 6,178,397 B1 * | 1/2001 | Fredenburg | 704/1 |
| 6,272,464 B1 * | 8/2001 | Kiraz et al. | 704/257 |
| 6,389,394 B1 * | 5/2002 | Fanty | 704/249 |
| 6,963,871 B1 * | 11/2005 | Hermansen et al. | 1/1 |
| 7,047,193 B1 * | 5/2006 | Bellegarda | 704/254 |
| 7,292,980 B1 * | 11/2007 | August et al. | 704/254 |
| 7,567,904 B2 * | 7/2009 | Layher | 704/270 |
| 2002/0103646 A1 * | 8/2002 | Kochanski et al. | 704/260 |
| 2004/0153306 A1 | 8/2004 | Tanner et al. | 704/4 |
| 2005/0060156 A1 * | 3/2005 | Corrigan et al. | 704/270.1 |
| 2005/0159949 A1 | 7/2005 | Yu et al. | 704/235 |
| 2005/0273337 A1 * | 12/2005 | Erell et al. | 704/260 |
| 2006/0129398 A1 | 6/2006 | Wang et al. | 704/251 |
| 2007/0043566 A1 * | 2/2007 | Chestnut et al. | 704/257 |
| 2007/0219777 A1 * | 9/2007 | Chu et al. | 704/9 |
| 2007/0255567 A1 * | 11/2007 | Bangalore et al. | 704/260 |
| 2008/0059151 A1 * | 3/2008 | Chen et al. | 704/9 |

OTHER PUBLICATIONS

Sharma, "Speech Synthesis", Jun. 2006, Thesis Report, Electrical and Instrumentation Engineering Department Thapar Institute of Engineering & Technology, India, pp. 1-77.*
Llitjós, Ariadna Gont, Black, Alan W., "Evaluation and Collection of Property Name Pronunciations Online", 2002, pp. 247-254.
Maison, Benoît, et al., Pronunciation Modeling for Names of Foreign Origin, pp. 429-434, 2003.
Oshika, Beatrice T., et al., "Improved Retrieval of Foreign Names from Large Databases," pp. 480-487, 1988 IEEE.
Jannedy, Stefanie, et al., "Name Pronunciation in German Text-to-Text Speech Synthesis."

* cited by examiner

*Primary Examiner* — Richemond Dorvil
*Assistant Examiner* — Olujimi Adesanya
(74) *Attorney, Agent, or Firm* — Carole Boelitz; Micky Minhas

(57) ABSTRACT

An automated method of providing a pronunciation of a word to a remote device is disclosed. The method includes receiving an input indicative of the word to be pronounced. The method further includes searching a database having a plurality of records. Each of the records has an indication of a textual representation and an associated indication of an audible representation. At least one output is provided to the remote device of an audible representation of the word to be pronounced.

15 Claims, 10 Drawing Sheets

50 52 54 56 58

| | | | | |
|---|---|---|---|---|
| 50a | Name1 | Origin 1 | Pronunication 1 | Meta |
| 50b | Name2 | Origin 2A | Pronunication 2A | Meta |
| 50c | Name2 | Origin 2B | Pronunication 2B | Meta |
| 50d | Name3 | Origin 3A | Pronunication 3A | Meta |
| 50e | Name3 | Origin 3B | Pronunication 3B1 | Meta |
| 50f | Name3 | Origin 3B | Pronunication 3B2 | Meta |

12

NAME SYNTHESIS

BACKGROUND

Increasingly, as communication technologies improve, long distance travel becomes more affordable and the economies of the world have become more globalized, contact between people who have different native languages has increased. However, as contact between people who speak different native languages increase, new communication difficulties can arise. Even when both persons can communicate in one language, problems can arise. One such problem is that it may be difficult to determine how a person's name is pronounced merely by reading the name because different languages can have different pronunciation rules for a given spelling. In situations such as business meetings, conferences, interviews, and the like, mispronouncing a person's name can be embarrassing. Conversely, providing a correct pronunciation of a person's name can be a sign of respect. This is particularly true when the person's name is not necessarily easy to pronounce for someone who does not speak that person's native tongue.

Part of the problem, as discussed above, is that different languages do not necessarily follow the same pronunciation rules for written texts. For example, a native English speaker may be able to read the name of a person from China, Germany, or France, to name a few examples, but unless that person is aware of the differing pronunciation rules between the different countries, it may still be difficult for the native English speaker to correctly pronounce the other person's name. To further complicate matters, names that might be common in one language can be pronounced differently in another language, despite having an identical spelling. Furthermore, knowing all of the pronunciation rules may not lead a correct pronunciation of a name that is pronounced differently from what might be expected by following a language's pronunciation rules. What is needed, then, is a way to provide an indication of the correct pronunciation of a name.

The discussion above is merely provided for general background information and is not intended to be used as an aid in determining the scope of the claimed subject matter.

SUMMARY

In one illustrative embodiment, an automated method of providing a pronunciation of a word to a remote device is disclosed. The method includes receiving an input indicative of the word to be pronounced. A database having a plurality of records each having an indication of a textual representation and an associated indication of an audible representation is searched. The method further includes providing at least one output to the remote device of an audible representation of the word to be pronounced.

In another illustrative embodiment, method of providing a database of pronunciation information for use in an automated pronunciation system is disclosed. The method includes receiving an indication of a textual representation of a given word. The method further includes creating an indication of an audio representation of the given word. The indication of an audio representation is associated with the indication of a textual representation. The associated indications are then stored in a record.

In yet another embodiment, a system adapted to provide an audible indication of a proper pronunciation of a word to a remote device is disclosed. The system includes a database having a plurality of records. Each of the records has a first data element indicative of a textual representation of a given word and a second data element indicative of an audible representation of the given word. The system further includes a database manager for communicating information with the database. A text to speech engine capable of receiving a textual representation of a word and providing an audible representation of the input is included in the system. In addition, the system has a communication device. The communication device is capable of receiving an input from the remote device indicative of a textual representation of a word and providing the remote device an output indicative of an audible representation of the input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
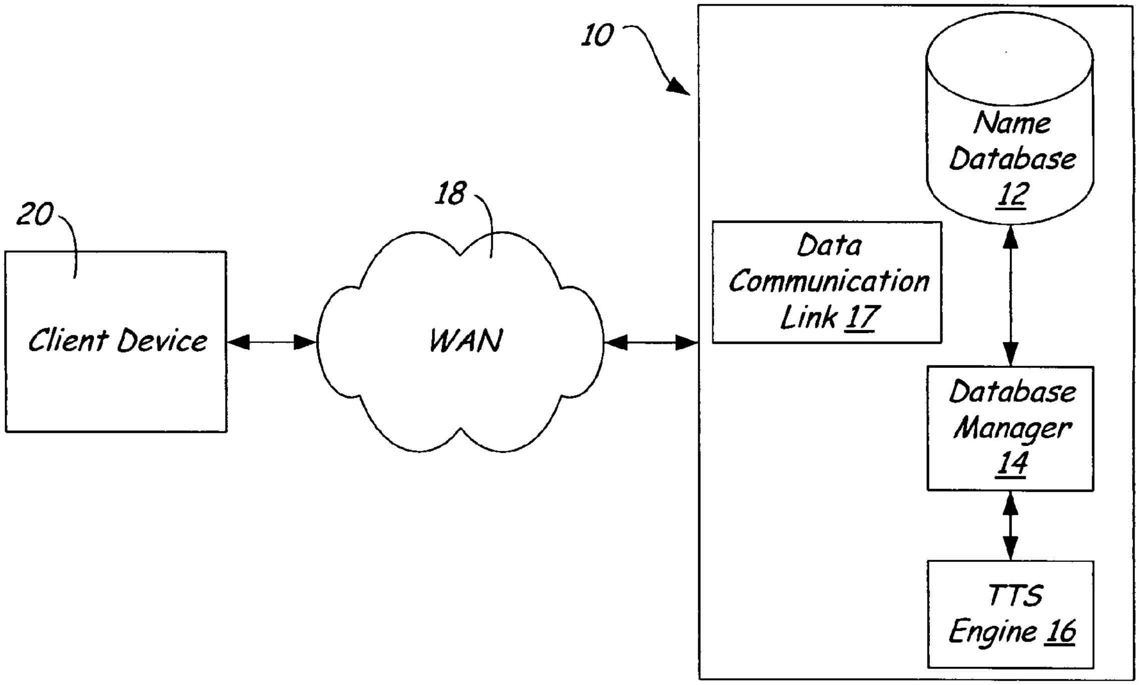
FIG. 1 is a block diagram illustrating a system for synthesizing and providing pronunciation information for a name according to one illustrative embodiment.

FIG. 1 illustrates a system 10 for providing to a remotely located client device 20 one ore more suggested pronunciations for personal names according to one illustrative embodiment. The system 10 includes a database 12, which stores information related to the pronunciation of known set of names. Details of the information stored in the database 12 will be discussed in more detail below. The system 10 also includes a database manager 14, which is capable of accessing information on the database 12. The system 10 also includes a data communication device or link 17, which is capable of sending and receiving information to and from devices such as client device 20 that are located outside of the system 10.

System 10 includes a text-to-speech (TTS) engine 16, which, in one embodiment is configured to synthesize a textual input into an audio file. The TTS engine 16 illustratively receives a textual input from the database manager 14. The textual input, in one illustrative embodiment, is a phoneme string received from database 12 as a result of a query of the database 12 by database manager 14. Alternatively, the textual string may be a phoneme generated by the database manager 14 or a textual string representing the spelling of a name. The TTS engine 16 provides an audio file that represents a pronunciation of the given name for each entry provided to it by the database manager 14. Alternatively, the TTS engine 16 can provide a phoneme string as an output from a textual input. The database manager 14 may receive that output, associate it with the textual input and store it in the database 12.

The data communication link 17 of system 10 is illustratively configured to communicate over a wide area network (WAN) 18 such as the Internet to send and receive data between the system 10 and externally located devices such as the client device 20. In one illustrative embodiment, the client device 20 is a mobile telephone. Alternatively, the client device 20 can be any type device that is capable of accessing system 10, including, without limitation, personal computing devices, such as desktop computers, personal data assistants, set top boxes, and the like. Client device 20, in one illustrative embodiment, communicates with the system 10 via the WAN 18 to provide the system 10 with information as required. The types of information provided to the system 10 can include a request for a pronunciation or information related to pronunciation of a specific name. Details of the types of information that can be provided from the client device 20 to the system 10 will be provided below.

System 10 illustratively provides, in response to a request from the client device 20, information related to the pronunciation of a particular name to the client device 20. In one illustrative embodiment, the system 10 provides the audio file created by the TTS engine 16 that represents the audio made by pronouncing the particular name. The client device 20 can then play the audio to provide an indication of a suggested pronunciation of the particular name. In some cases, one name can have more than one suggested pronunciation. For example, the text representation of a name in one language may be pronounced one way while the same exact representation can be pronounced differently in another language. As another example, the same text representation of a name can have more than one pronunciation in the same language.

Figures 2, 3:
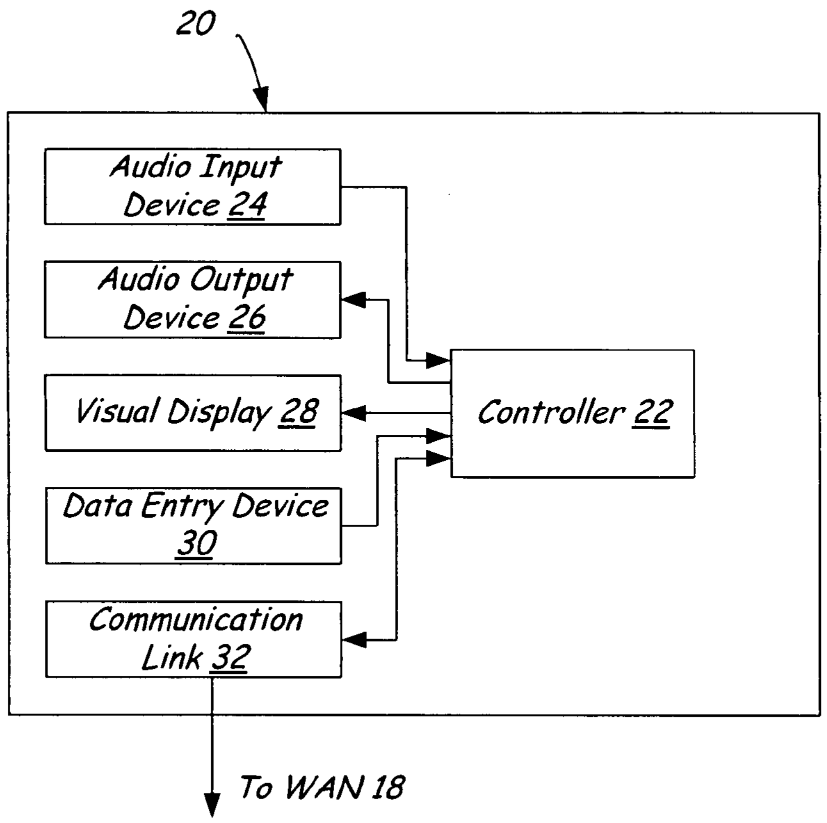
FIG. 2 is a block diagram illustrating a client device for use with the system of FIG. 1.
FIG. 3 is a schematic detailing a database for storing name information for the system of FIG. 1.

FIG. 2 illustrates the client device 20 in more detail according to one illustrative embodiment. Client device 20 includes a controller 22, which is adapted to perform various functions in the client device 20. For example, controller 22 interfaces with an audio input device 24 to receive audio input as needed. Similarly, the controller 22 provides a signal to an audio output device 26, which can convert that signal to an audio output. For example, the audio output device 26 can provide an audible audio that is representative of the pronunciation of a particular name. Controller 22 also illustratively interfaces with a visual display 28. Controller 22 provides a signal to the visual display 28, which converts that signal into a visual display of information. For example, the visual display 28 illustratively provides prompts for information during the process of gathering information related to a request for pronunciation of a particular name. Controller 22 also interfaces with a data entry device 30, which can be used by the user to input information to the client device 20. Data entry device 30 can be a keyboard, a keypad, a mouse or any other device that can be used to provide input information to the client device 20. Information is communicated from the controller 22 between the client device 20 and, for example, the system 10 through a communication link 32 that is capable of accessing and communicating information across the WAN 18.

Figure 4:
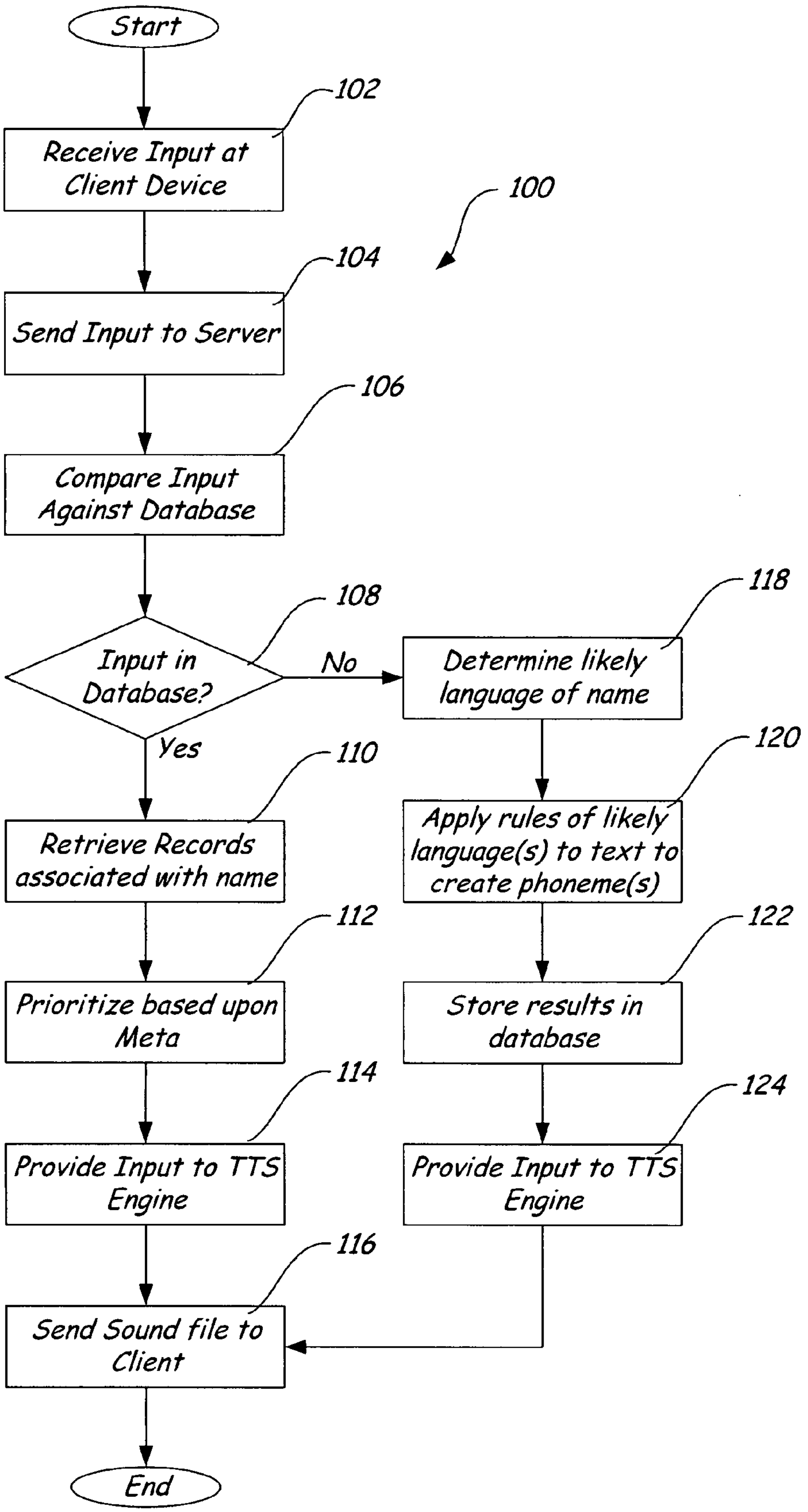
FIG. 4 is a flowchart detailing a method of accessing the system of claim 1 to receive a suggested pronunciation of a name according to one illustrative embodiment.

FIG. 4 details a method 100 of using the system 10 to receive input from the user of the client device 20 and provide an output back to the client device 20 according to one illustrative embodiment. When the user wishes to query the system 10 for information related to the pronunciation of a particular name, the user activates the client device 20 to prepare the client device 20 to receive input data. This is shown in block 102. Preparation of the client device 20 can be accomplished in any one of a number of different ways. For example, the user can activate a program that executes on the client device as an interface between the user and the system 10. The program illustratively launches a user interface, which at block 102 prompts the user to provide input to the client device 20.

Figure 7A:
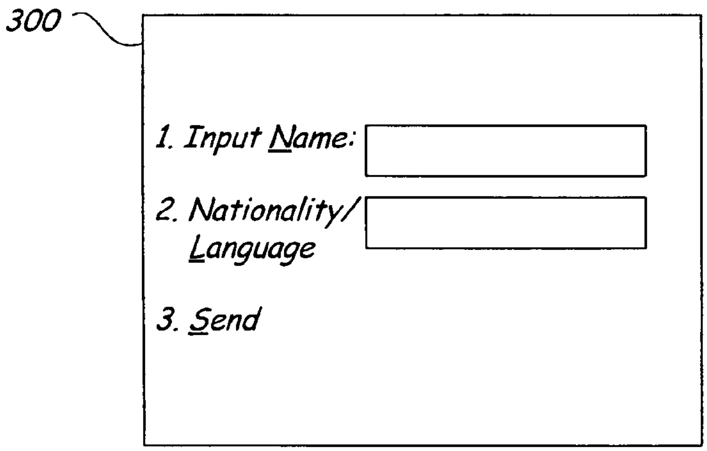
FIGS. 7A-7H are views of information provided on a display on the client device of FIG. 1 according to one illustrative embodiment.

An example of a screen view 300 of a visual display (28 in FIG. 2) for prompting the user for information relative to a name for which a pronunciation is sought is shown in FIG. 7A. The screen view 300 illustratively includes information that prompts the user to provide a text string that is representative of the particular name. As an example, the screen view 300 prompts the user to spell the name for which pronunciation information is desired. In addition, in one illustrative embodiment, the user is prompted to provide the language and/or nationality of the name. For example, the user may input the name "Johansson" and input the country United States. Once the user has provided information relative to the name and nationality or language of origin of the name, the user illustratively provides an indication to send the information to system 10. Alternatively, the user need only provide the name information and not the nationality or language information. Alternatively still, the visual display screen 28 on the client device 20 does not prompt for nationality or language information. It should be understood that the visual display example 300 and all other display examples discussed herein are provided for illustrative purposes only. Other means of displaying and prompting information from the user may be employed, including different arrangements of visual data, the use of audible prompts and the like without departing from the spirit and scope of the discussed embodiments.

Once the user has provided an input indicative of a desire to send the inputted information to the system 10, the client device 20 sends such information to the system 10 as is detailed in block 104. The input is compared against information stored in the system 10, as is detailed in block 106. The name input into the client device 20 and sent to the system 10 is compared against entries in the database 12 to determine whether there are any entries that match the name provided.

Referring to FIG. 3, a representative model of database 12 is provided. Database 12 can be any type of database and is in no way limited by the exemplary discussion provided herein. Database 12 illustratively includes a plurality of records 50, each of which is representative of an input provided to the database 12. Each record 50 includes a plurality of fields, including a name field 52, which includes and indication of a textual input. In one embodiment, the textual input string that describes the name to be pronounced is stored in name field 52. In addition, each record includes an origin field 54, which includes information or an indication related to the location of origin of the name or the person who has the name. A pronunciation field 56 includes an indication related to the pronunciation of the name in question. The pronunciation field 56 can include, for example, a phoneme string representative of the pronunciation of the name or an audio file in a format such as WAV that provides an audible representation of a pronunciation of the name. Alternatively, the pronunciation field 56 can include information linking the field to a location where a phoneme string or an audio file resides.

A meta field 58 can include information related to the record 50 itself. For example, the meta field 58 can include information as to how many times the particular record 50 has been chosen as an acceptable pronunciation for the name in question by users. The meta field 58 can also illustratively include information about the source of the pronunciation provided. For example, the meta field may have information about a user who provided the information, when the information was provided and how the user provided the information. Such information, in one embodiment is used to predetermine a priority of pronunciations when a particular name has more than one possible pronunciation.

Reviewing the exemplary database 12 provided in FIG. 3, shows three different name strings, name1, name2, and name3 that have been stored in the database 12. A single record 50*a* includes the name1 name string in its name field 52. However, records 50*b* and 50*c* each include the name2 name string in their name fields 52. Record 50*b* and 50*c* have different data in their origin fields 54, indicating that the name2 is known or believed to be used in two different languages or locations. It is possible that the pronunciation of the name2 name string is the same in each of the different locations. Regardless, each of the records 50*b* and 50*c* have fields for providing information related to the pronunciation of the name2 name string in different languages or locations of origin.

Records 50*d*, 50*e*, and 50*f* each have the name3 name string located in their respective name fields 52. In addition, it can be seen that records 50*e* and 50*f* have the same data in their origin field 54. Thus, more than one pronunciation is associated with the same location. This is represented in the pronunciation fields 56 of records 50*e* and 50*f*. Information in the meta field 58 of each record 50 will provide an indication of the popularity of one pronunciation relative to another. These indications can be used to order the pronunciations associated with a particular record 50 provided to the client device 20 or, alternatively, to determine whether a particular pronunciation is, in fact, provided to the client device 20.

It is to be understood that the representation of the database 12 provided in FIG. 3 is for illustrative purposes only. The database 12 is not bound by the description and arrangement of this discussion. Database 12 can be arranged in any suitable form and include more or less information than is shown here without departing from the spirit and scope of the discussion.

Returning again to FIG. 4, if it is determined at block 108 that one or more records 50 in the database 12 have data in their name field 50 that matches the name data provided by the client device 20, each of the matching records 50 is retrieved by the database manager 14, shown in block 110. If more than one record 50 matches the name data provided by client device 20, the matching records are prioritized by examining the meta data provided in each of the meta records 58 of the matching records 50. This is shown in block 112.

Once the matching records 50 are prioritized, if any of the matching records 50 have phoneme strings in their pronunciation records 56, those phoneme strings are sent to the TTS engine 16, which illustratively synthesizes the phoneme string into an audio file. Alternatively, of course, the information in the pronunciation record 56 can be associated with an audio file that is either previously synthesized by the TTS engine 16 from a phoneme string or received as an input from the client device 20. The input of an audio file from the client device 20 is discussed in more detail below.

Once any phoneme strings are synthesized into an audio file by the TTS engine 16, the one or more audio files associated with the one or more records 50 are sent to the client device 20, as is illustrated by block 116. In one illustrative embodiment, the audio files and associated data are provided to the client device 20 in order of their priority. Origin data from origin field 54 related to the origin of the pronunciation is also illustratively sent to the client device 20, although alternatively, such origin data need not be sent.

Alternatively, if it is determined that no entries in the database 12 match the name input by the user into the client device 20, the database manager 14 illustratively attempts to determine the nationality or language of the name provided by employing an algorithm within the database manager 14. In one illustrative embodiment, the database manager 14 determines one or more possible locations of origin for the inputted name. The name and pronunciation rules associated with the locations of origin are illustratively employed by the database manager 14 to create a phoneme string for the name in each language or location of origin determined the database manager 14 as is illustrated in block 120. Each of the phoneme strings is stored in the database 12 as is shown in block 122.

Each of the phoneme strings generated by the database manager 14 is then illustratively provided to the TTS engine 16 as is shown in block 124. The TTS engine 16 illustratively creates an audio file, which provides an audio representative of a pronunciation of the name provided using the pronunciation rules of a given language or location for each provided phoneme string. The resulting audio file for each phoneme string is illustratively associated with the text string of the given record 50 and provided back to the client device 20. This is illustrated by block 116.

Figure 5:
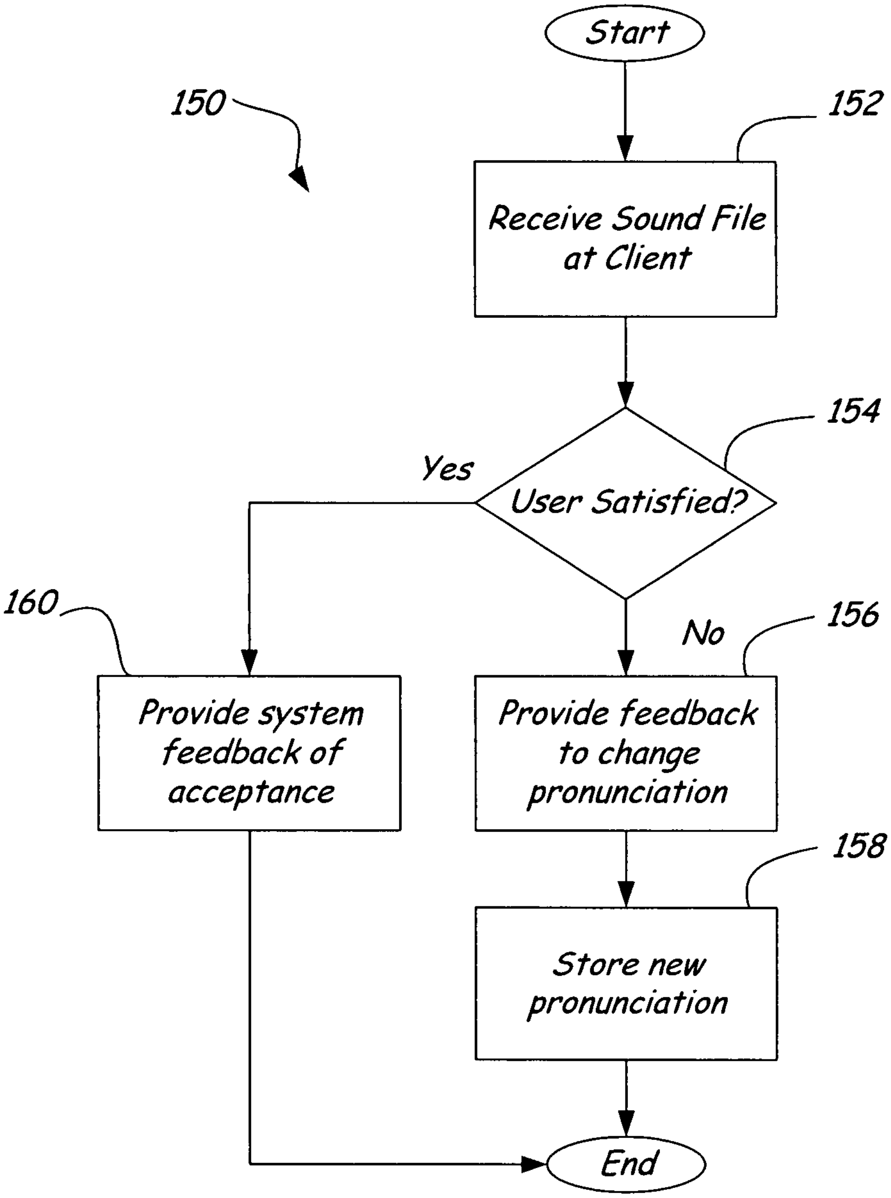
FIG. 5 is a flowchart detailing a method of providing feedback from a client device to the system of FIG. 1 regarding provided pronunciation data according to one illustrative embodiment.
Figure 7B:
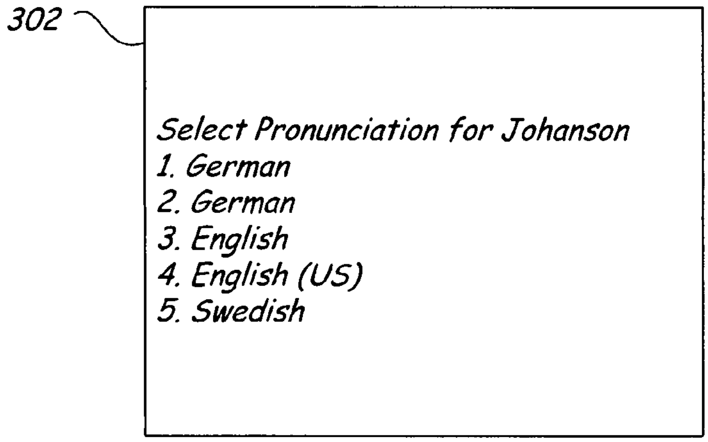

FIG. 5 illustrates a method 150 of providing feedback regarding the pronunciations provided to the client device 20, previously provided at block 116 of FIG. 4. At step 152, one or more audio files, previously sent to the client device 20, as shown in block 116, are received by the client device 20. FIG. 7B provides an illustrative display 302 indicating a list of five pronunciations found for the name “Johansson”. The first two pronunciations are German, the third is English, the fourth pronunciation is English (in the United States) and the fifth pronunciation is Swedish. Alternatively, if the user has specified a language or location of origin, only those pronunciations that have matching data in their origin fields 54 would be displayed. Thus, for example, if the user had specified English (US) as the language or nationality, only the fourth record would have been returned to the client device 20.

Figure 7C:
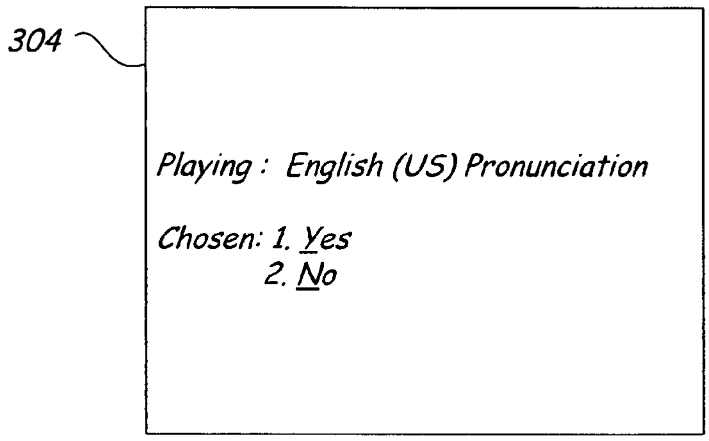

Given the list of possible pronunciations illustratively shown in display 302, the user selects one of them and the client device 20 plays the audio file associated with the selection through the audio output device 26 for the user. The user can then choose whether to select that audio file as a pronunciation for the given name. FIG. 7C provides an example of a display 304 prompting the user to decide whether to choose the particular audio file as the proper pronunciation. By selecting the audio file, the user can allow the client device 20 to provide an indication of that selection to the system 10 for storage in the meta field 58 of the selected record 50 of database 12. Such information will help to prioritize records of pronunciations in future usage. If the user wishes to hear other pronunciations, the user can decline to select the given pronunciation, at which point the client device illustratively provides display 302 to the user and waits for an input from the user to select another of the possible pronunciations for review.

Figure 7D:
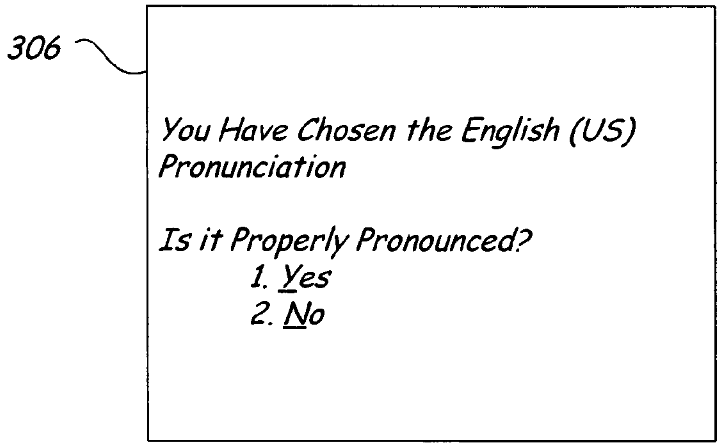

Once the user has chosen a pronunciation, the client device illustratively queries whether the user is satisfied with the pronunciation is provided. This is represented by decision block 154 in FIG. 4 and an example display 306 is provided in FIG. 7D. If the user determines that the pronunciation is correct, he provides an indication of that determination to the client device 20 as instructed by the example 306 shown on visual display 28. The indication is then provided to the system 10 as feedback of acceptance of the pronunciation as is shown in block 160.

If the user determines that the pronunciation is incorrect, the user illustratively provides feedback indicating a proper pronunciation, shown in block 156 and discussed in more detail below. The information provided by the user is stored in the database 12 as a new record, including the name field 52, origin field 54 (determined by the previous selection as discussed above) and the new pronunciation field 56. In addition data related to the user who provides the information and when the information is provided can be provided to the meta field 58. In one illustrative embodiment, any user of the system 10 will be queried to provide feedback information relative to the quality of a pronunciation. Alternatively, the system 10 may allow only select users to provide such feedback. Once the new pronunciation is created, it is stored in database 12. This is indicated by block 158.

Figure 6A:
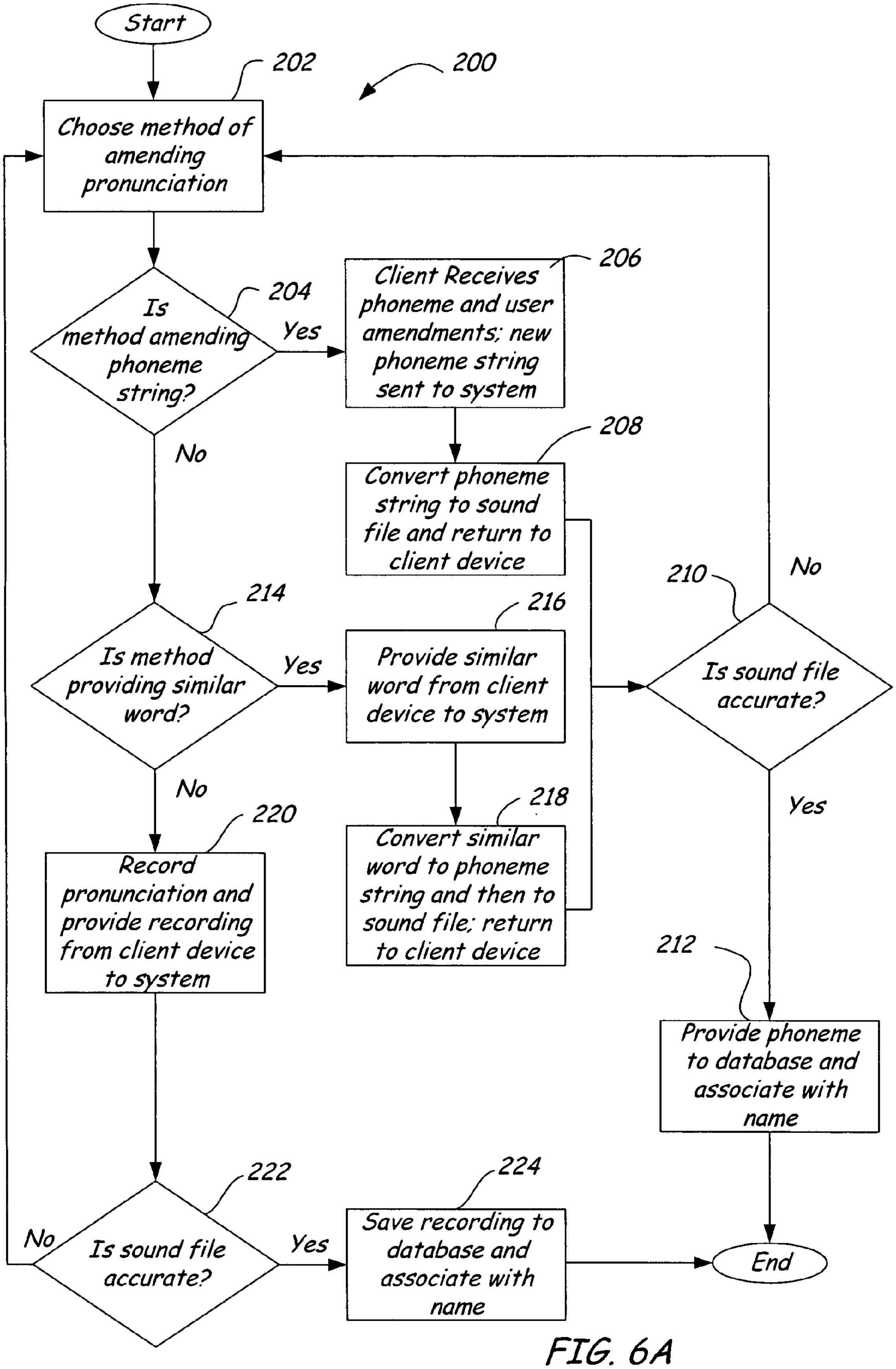
FIG. 6A is a flowchart detailing a method of providing an alternative pronunciation for a name to the system of FIG. 1 according to one illustrative embodiment.

FIG. 6A illustrates a method 200 for creating a record 50 for database 12 (as shown in FIG. 3) by incorporating user provided data about the desired pronunciation of a particular textual input string according to one embodiment. Method 200 provides a more detailed method for the step 156 discussed above. In one illustrative embodiment, method 200 provides three different possible methods for the user to provide input to change the pronunciation of the textual string: editing the phoneme string, providing a word similar in pronunciation, or recording an audio file of the pronunciation. Each of these three methods will be discussed in more detail below. In alternative embodiments, any combination of the three methods may be available to the user.

Figure 7E:
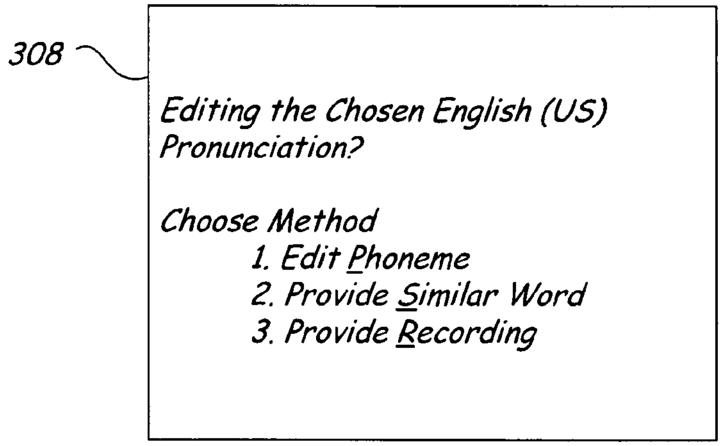
Figure 7F:
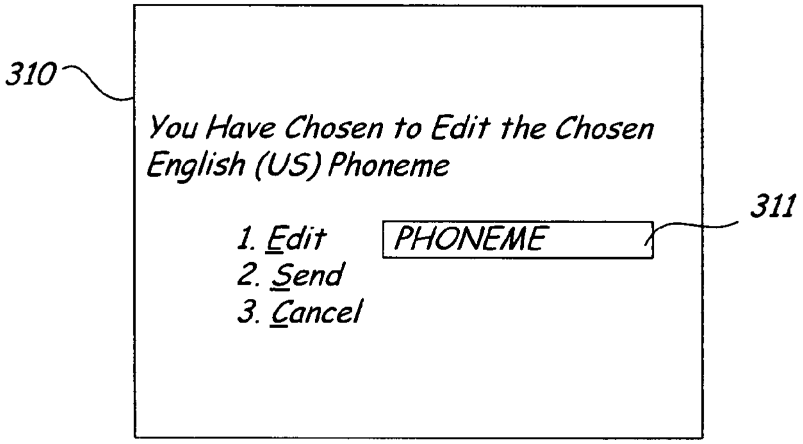

Once it has been determined that the user wishes to provide feedback relative to the pronunciation of a previously chosen name (as is shown in block 156 of FIG. 5), the client device 20 provides the user a prompt to choose one of the methods. This is shown in screen 308 of FIG. 7E. The user then makes a choice from one of the options provided. This is illustrated in block 202. Once the user has made a choice, the system 10 determines what choice has been made and acts accordingly. If the user has chosen the method of amending the phoneme string (as indicated by a yes answer at decision block 204), the client device 20 receives the current string on the client device 20 (shown in window 311 of screen 310 in FIG. 7F) and edits the phoneme string. The edited phoneme string is then sent from the client device 20 to the system 10. This is illustrated in block 206. The database manager 14 provides the edited phoneme string to the TTS Engine 16. The TTS Engine 16 converts the phoneme string to an audio file. The database manager 14 then provides the audio file to the client device 20. This is shown in block 208. The client device 20 then plays the audio file by sending a signal to the audio output device 26. If the user determines that the audio file is an accurate pronunciation of the name (as in block 210), the database manager 14 saves the edited phoneme string in the database 12, which is shown in block 212. If however, at block 210 the audio file is not an accurate representation, the method returns to block 202 to determine a method of amending the pronunciation.

Figure 7G:
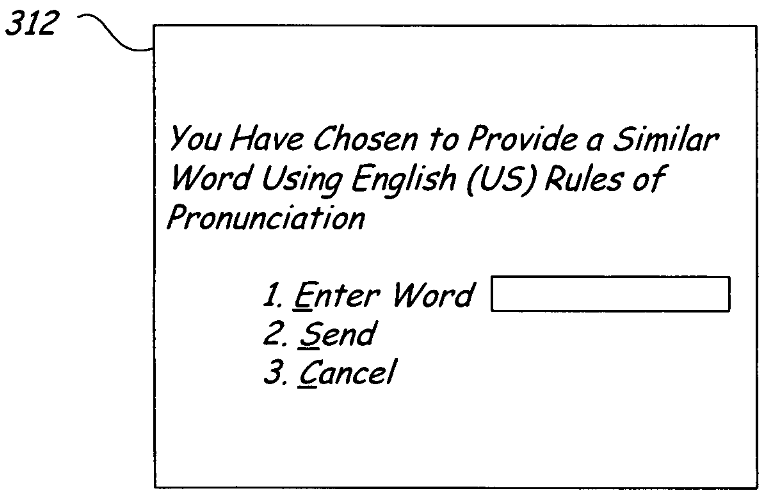

Returning to block 204, if it is determined that the method selected by the user is not the method of amending the phoneme string, the method next determines whether the method selected is choosing a similar sounding word. This is can be an advantageous method when the user is not proficient with providing phoneme strings representative of a given word or phone. If it is determined at block 214 that method of choosing a similar sounding word is the chosen method, the user is prompted to provide a similar block, shown in block 216 and screen 312 shown in FIG. 7G. The user chooses a similar word and it is provided from client device 20 to the system 10. The "similar" word is converted to a phoneme by system 10 and sent to the TTS engine, which creates an audio file. The TTS engine then provides the audio file to the client device 20. This is shown in block 218.

If it is determined at block 210 that the audio file is sufficiently "accurate", the database manager 14 saves the phoneme string associated with the similar word in the database 12, which is shown in block 212. Conversely, if the user determines that the audio file is not sufficiently close to the desired word (as determined at decision block 210), the method 200 returns to block 202 to determine a method of amending the pronunciation.

As an example of the use a similar word to create a proper pronunciation, consider the Chinese surname "Xin". The user can enter the word "shin" and using English rules, the database manager 14 converts the word shin to a phoneme string and provides the phoneme string to the TTS engine 16. The resultant audio file is so similar to the correct pronunciation of the name Xin that it is, for all intents and purposes a "correct" pronunciation.

Figure 7H:
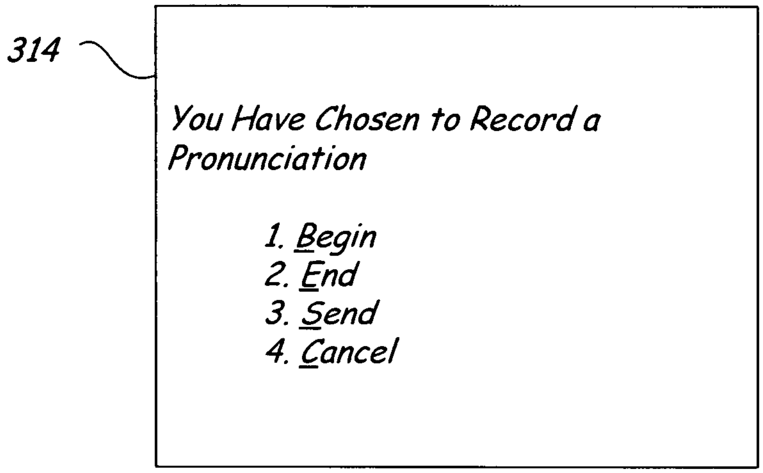

Returning to block 214, if it is determined that the method selected is not the similar word method, it is assumed that the method to be implemented is to have the user record a pronunciation. FIG. 7H illustrates a screen 314, which instructs the user to record a pronunciation. This is shown in block 220. The user is then asked to verify if the recording is correct. This is illustrated in block 222. If the recording is deemed by the user to be correct, the recording is saved to the database and associated with the name, as is illustrated in block 224. In one illustrative embodiment, saving the recording to a database includes storing an indication of the recording in a pronunciation field 56 of a record 50. If the recording is not correct, the user is asked to choose a method of amending the pronunciation, as previously discussed, at block 202.

Figure 6B:
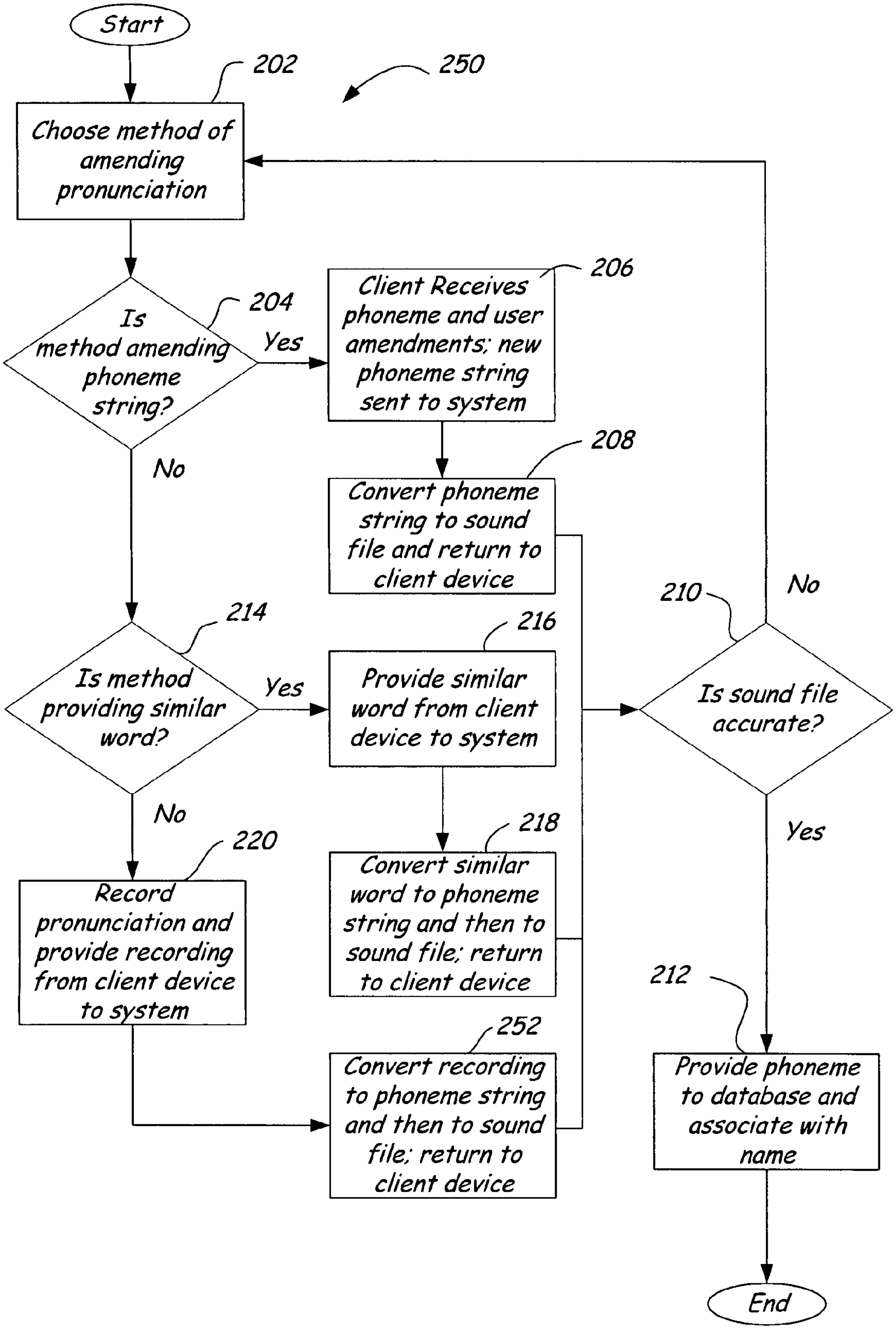
FIG. 6B is a flowchart detailing a method of providing an alternative pronunciation for a name to the system of FIG. 1 according to another illustrative embodiment.

FIG. 6B illustrates a method 250 for creating a record 50 for database 12 (as shown in FIG. 3) by incorporating user provided data about the desired pronunciation of a particular textual input string according to another embodiment. Method 250 is illustratively similar to the method 200 discussed above. Portions of the method 250 that are substantially similar to the method 200 discussed above are illustrated with blocks having the same reference indicators as those used to illustrate method 200 in FIG. 6A.

As discussed above with respect to method 200, method 250, provides three different possible methods for the user to provide input to change the pronunciation of the textual string: editing the phoneme string, providing a word similar in pronunciation, or recording an audio file of the pronunciation. The method for editing the phoneme string or providing a word similar in pronunciation are illustratively the same for method 250 as for method 200. It should be understood, of course, that variations in either of the methods for editing the phoneme string of providing a word similar in pronunciation can be made to method 250 without departing from the scope of the discussion.

Method 250 illustratively provides an alternative method incorporating a recorded audio file of the pronunciation of a textual string. At block 220, the user records a pronunciation for the textual string. The recording is then provided by the client device to the server. At block 252, the server provides voice recognition to convert the recording into a textual string. Any acceptable method of performing voice recognition may be employed. The textual string is then converted to a sound file and the sound file is returned to the client device. The user then evaluates the sound file to determine whether the sound file is accurate. This is illustrated at block 210. Based on the user's evaluation, the phoneme is either provided to the database as at block 212 or the user selects a new method of amending the pronunciation of the textual input as at block 202. It should be appreciated that in any of the methods of changing the pronunciation of a textual string discussed above, additional steps may be added. For example, if the speech recognition provides an unacceptable result, rather than returning to block 202, the client device can alternatively attempt to provide another audible recording or modify the textual string to provide a more acceptable sound file.

The embodiments discussed above provide important advantages. Systems and methods discussed above provide a way for users to receive an audio indication of the correct pronunciation of a name that may be difficult to pronounce. In addition, the system can be modified by some or all users to provide additional information to the database 12. The system is accessible via a WAN through mobile devices or computers, thereby providing access to users in almost any situation.

Figure 8:
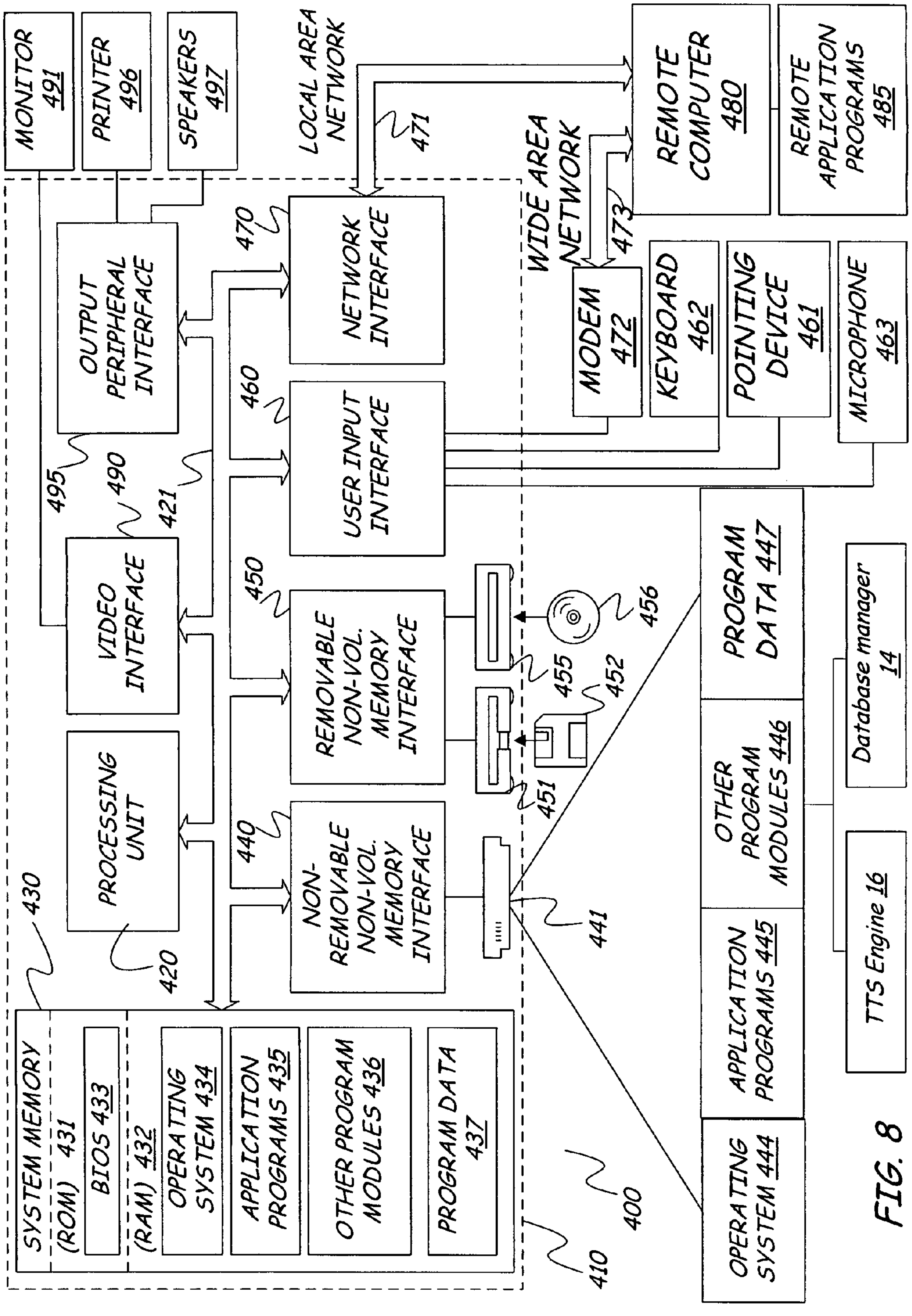
FIG. 8 is a block diagram of one computing environment in which some of the discussed embodiments may be practiced.

FIG. 8 illustrates an example of a suitable computing system environment 400 on which embodiments of the name synthesis discussed above may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. The database 12 discussed in the embodiments above may be stored in any of the storage media listed above. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. For example, program modules related to the database manager 14 or the TTS engine 16 may be resident or executes out of ROM and RAM, respectively. By way of example, and not limitation, FIG. 8 illustrates operating system 434, application programs 435, other program modules 436, and program data 437.

The computer 410 may also include other removable/non-removable volatile/nonvolatile computer storage media. By way of example only, FIG. 8 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450. Again, the program elements of the server side elements may be stored in any of these storage media. In addition, the client device 20 can have resident storage media that stores executable modules.

The drives and their associated computer storage media discussed above and illustrated in FIG. 8, provide storage of computer readable instructions, data structures, program modules and other data for the computer 410. In FIG. 8, for example, hard disk drive 441 is illustrated as storing operating system 444, application programs 445, other program modules 446, such as the database manager 14 and the TTS engine 16, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In some embodiments, the visual display 28 can be a monitor 491. In addition to the monitor, computers may also include other peripheral output devices such as speakers 497, which may be used as an audio output device 26 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 8 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. The network interface can function as a data communication link 32 on the client device or data communication link 17 on the system 10. When used in a WAN networking environment, such as for example the WAN 18 in FIG. 1, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 8 illustrates remote application programs 485 as residing on remote computer 480, which can be a client device 20. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing a pronunciation of a proper name to a remote device, the method comprising:

receiving, with a computer processor, a first textual input indicative of the proper name to be pronounced;

searching a database, with the computer processor, the database having a plurality of records each record having an indication of a textual representation of a proper name and an associated indication of an audible representation, of a proper name; and identifying a record for a matching proper name, when the textual representation in the record matches the first textual input;

providing at least one output to the remote device of the audible representation of the record identified, for pronunciation of the proper name in the record identified;

receiving a second textual input indicative of a desired pronunciation from a remote device, the second textual input comprising a textual representation for a different word, other than the proper name indicated by the first textual input, the different word having a different spelling than the proper name indicated by the first textual input but a similar pronunciation;

generating a new audible representation from the textual representation of the different word using an automated text to speech engine;

associating, with the computer processor, the new audible representation with the first textual input indicative of the proper name to be pronounced; and creating a record in the database, with the computer processor, including the proper name to be pronounced and the associated new audible representation.

2. The computer-implemented method of claim 1, wherein searching the database includes comparing the first textual input against the indication of the textual representation of at least one of the plurality of records.

3. The automated method of claim 1, wherein providing at least one output of an audible representation comprises:

retrieving an indication of an audible representation from the database; and creating an audio representation from the retrieved indication of an audible representation.

4. The automated method of claim 3, wherein the database includes more than one record having an indication of a textual representation that matches the first textual input and further comprising:

retrieving an audible representation from each of the records having a textual representation that matches the first textual input; and wherein providing at least one output to the remote device of an audible representation includes providing an output of each of the retrieved audible representations.

5. The automated method of claim 4, wherein providing an output of each of the retrieved audible representations includes providing the outputs according to a pre-established priority.

6. A computer-implemented method of providing a database of pronunciation information for use in an automated pronunciation system, the method comprising:

receiving, as an input at a computer processor, a plurality of indications of textual representations of a plurality of proper names for having pronunciations stored in the database;

using an automated text-to-speech synthesizer to automatically generate an indication of an audio representation associated with each of the proper names, the audio representation identifying a pronunciation;

associating, using the computer processor, the indication of an audio representation with the indication of a textual representation for the associated proper name;

storing the associated indications in a record in the database; and for a given proper name, retrieving a previously stored record including indications of a textual representation of the given proper name and an audio representation of the given proper name;

providing the audio representation of the given proper name to a remote device, that is remote from the database;

receiving data from the remote device including the indication of the textual representation of the given proper name and a textual representation of a different word having a different spelling than the given proper name;

creating an indication of an audio representation of the different word using the automated text-to-speech synthesizer; and associating the indication of the audio representation of the different word with the textual representation of the previously stored record for the given proper name.

7. The method of claim 6, and further comprising:

for a given proper name, determining an origin for the given proper name; and applying a set of pronunciation rules associated with the origin to the textual representation for the given proper name to create the indication of an audio representation.

8. The method of claim 6, wherein receiving the modified indication of the audio representation includes receiving a phoneme string and storing data in the database comprises storing the phoneme string in the database.

9. The method of claim 6, wherein receiving the modified indication of the audio representation includes receiving an audio file for the given proper name.

10. The method of claim 9 and further comprising:

generating a textual representation of the audio file for the given proper name; and wherein storing the received data includes storing an indication of the textual representation for the given proper name.

11. A system adapted to provide an audible indication of a proper pronunciation of a proper name to a remote device that is remote from the system, the system comprising:

a database having a plurality of records each having a first data element indicative of a textual representation of a proper name and a second data element indicative of an audible representation of the proper name, wherein at least two records of the plurality of records in the database have first data elements indicative of a textual representation of a given proper name to be pronounced and second data elements indicative of different audible representations of the same given proper name to be pronounced, along with a separate metadata element indicative of a priority of each of the different audible representations based on an origin of the given proper name, wherein the at least two records in the database are prioritized using the metadata elements in a first order for a first origin of the given proper name and in a second order, that is different than the first order, for a second origin of the proper name;

a database manager communicating information with the database;

a text to speech engine that receives, as a text input, the textual representation of the given proper name to be pronounced and generates an audible representation of the text input; and a communication device receiving an input from the remote device over a network indicative of the textual representation of the proper name to be pronounced and an origin indication from the remote device, the communication device providing the remote device an output over the network indicative of the audible representation of the proper name to be pronounced generated by the text to speech engine and prioritized using the origin indication and metadata elements in the database, wherein the communication device and text to speech engine are remote from the remote device.

12. The system of claim 11, wherein the second data element of at least one of the plurality of records includes information relating to a phoneme string.

13. The system of claim 11, wherein the second data element of at least one of the plurality of records includes information relating to an audio file.

14. The system of claim 11, wherein the proper name to be pronounced has multiple different origins, and wherein each of the at least two records includes a third data element that is associated with the first data element of the record and indicates one of the multiple different origins for the proper name.

15. The system of claim 14, wherein at least one of the plurality of records includes a fourth data element having information indicative of a priority of the record.

* * * * *